US010816085B2

United States Patent
Olson et al.

(10) Patent No.: US 10,816,085 B2
(45) Date of Patent: Oct. 27, 2020

(54) AIRCRAFT LUBRICATION SYSTEM

(71) Applicant: Bell Helicopter Textron Inc., Fort Worth, TX (US)

(72) Inventors: Eric S. Olson, Fort Worth, TX (US); David R. Bockmiller, Fort Worth, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 326 days.

(21) Appl. No.: 15/874,054

(22) Filed: Jan. 18, 2018

(65) Prior Publication Data

US 2019/0219149 A1  Jul. 18, 2019

(51) Int. Cl.
| | |
|---|---|
| *F16H 57/04* | (2010.01) |
| *B64D 35/00* | (2006.01) |
| *B64C 29/00* | (2006.01) |
| *B64C 27/32* | (2006.01) |
| *B64C 27/04* | (2006.01) |

(52) U.S. Cl.
CPC ......... *F16H 57/0442* (2013.01); *B64D 35/00* (2013.01); *F16H 57/045* (2013.01); *F16H 57/0441* (2013.01); *F16H 57/0449* (2013.01); *B64C 27/04* (2013.01); *B64C 27/32* (2013.01); *B64C 29/0033* (2013.01); *B64C 29/0091* (2013.01)

(58) Field of Classification Search
CPC ............. F16H 57/0442; F16H 57/0441; F16H 57/0449; F16H 57/045; B64D 35/00; B64C 27/04; B64C 27/032; B64C 39/0033; B64C 29/0091
See application file for complete search history.

(56) References Cited

U.S. PATENT DOCUMENTS

2012/0227820 A1    9/2012  Poster
2016/0123456 A1*   5/2016  Goujet ................... B64C 27/12
                                                        184/6.4

(Continued)

FOREIGN PATENT DOCUMENTS

| DE | 10051356 A1 | 4/2002 |
|---|---|---|
| EP | 2253805 A2 | 11/2010 |
| JP | 08200031 | 6/1996 |

OTHER PUBLICATIONS

EPO Examination Report for EP Application No. 19151118.7 dated May 21, 2019, 9 pages.

(Continued)

*Primary Examiner* — Michael R Mansen
*Assistant Examiner* — Robert T Reese
(74) *Attorney, Agent, or Firm* — Patent Capital Group

(57) ABSTRACT

A system is provided in one example embodiment and may include a first reservoir for a lubricant; a second reservoir for the lubricant, wherein the first reservoir and the second reservoir are interconnected; a first pumping element to pump the lubricant from the first reservoir at a first flow rate; a second pumping element to pump the lubricant at a second flow rate, wherein the first flow rate and the second flow rate are different; and a gearbox coupled to the first pumping element and the second pumping element. The first reservoir may have a larger volume than the second reservoir and the first flow rate may be higher than the second flow rate.

18 Claims, 10 Drawing Sheets

(56) References Cited

U.S. PATENT DOCUMENTS

2016/0123457 A1* 5/2016 Harreau .............. F16H 57/0435
  184/6.4
2016/0305538 A1* 10/2016 Doertoluk ........... F16H 57/0442
  57/442
2017/0138461 A1   5/2017 Chory et al.
2017/0175875 A1* 6/2017 Lapeyre ................. F16N 39/04
2017/0284535 A1  10/2017 Ehinger

OTHER PUBLICATIONS

EPO Search Report for EP Application No. 19151118.7 dated May 6, 2019, 4 pages.
EPO Examination Report for EP Application No. 19151118.7 dated Oct. 9, 2019, 6 pages.
EPO Examination Report for EP Application No. 19151118.7 dated Apr. 7, 2020, 5 pages.

* cited by examiner

AIRCRAFT LUBRICATION SYSTEM

TECHNICAL FIELD

This disclosure relates in general to the field of aircraft and, more particularly, though not exclusively, to an aircraft lubrication system.

BACKGROUND

Aircraft include gearboxes that provide for the operation of aircraft rotor systems. During operation, an aircraft gearbox is lubricated by providing a flow of lubricant (e.g., oil) through the gearbox. In some instances, the flow of lubricant for a gearbox may be lost during a loss of lubrication event. For instances in which there is a loss of lubrication event for a gearbox, it is expected that the gearbox will continue to operate for a sufficient amount of time to allow the aircraft to be landed. In some cases, however, a gearbox may not be capable of operating for a sufficient amount of time to allow the aircraft to land during a loss of lubrication event. Accordingly, there are significant challenges in managing loss of lubrication events for aircraft.

SUMMARY

According to one aspect of the present disclosure, a system may be provided and may include a first reservoir for a lubricant; a second reservoir for the lubricant, wherein the first reservoir and the second reservoir are interconnected; a first pumping element to pump the lubricant from the first reservoir at a first flow rate; a second pumping element to pump the lubricant at a second flow rate, wherein the first flow rate and the second flow rate are different; and a gearbox coupled to the first pumping element and the second pumping element. In some cases, the gearbox may further be coupled to the first reservoir. The first reservoir may have a larger volume than the second reservoir and the first flow rate may be higher than the second flow rate. In some instances, the first flow rate may be at least ten times greater than the second flow rate. In some cases, the system may be configured within a wing of a tiltrotor aircraft and the gearbox may be associated with a nacelle of the tiltrotor aircraft.

In some cases the first reservoir may be a first reservoir portion of a common reservoir and the second reservoir may be a second reservoir portion of the common reservoir. The common reservoir may include at least one internal partition and the gearbox may further be coupled to the common reservoir.

The first pumping element may pump the lubricant to the gearbox for a first period of time and the second pumping element may pump the lubricant to the gearbox for a second period of time. In some cases, at least a portion of the first period of time and a portion of the second period of time may overlap and least another portion of the first period of time and another portion of the second period of time may not overlap.

According to one aspect of the present disclosure, an aircraft may be provided and may include a lubrication system and the lubrication system may include a first reservoir for a lubricant; a second reservoir for the lubricant, wherein the first reservoir and the second reservoir are interconnected; a first pumping element to pump the lubricant from the first reservoir at a first flow rate; and a second pumping element to pump the lubricant at a second flow rate, wherein the first flow rate and the second flow rate are different. The first reservoir may have a larger volume than the second reservoir and the first flow rate may be higher than the second flow rate. In some instances, the first flow rate may be at least ten times greater than the second flow rate. In some cases, the aircraft may further include a gearbox for a rotor system of the aircraft, wherein the gearbox may be coupled to the first pumping element, the second pumping element, and the first reservoir.

In still some cases, the first reservoir may be a first reservoir portion of a common reservoir, the second reservoir may be a second reservoir portion of the common reservoir, and the common reservoir may include at least one internal partition. In such cases, the aircraft may further include a gearbox for a rotor system of the aircraft, wherein the gearbox may be coupled to the first pumping element, the second pumping element, and the common reservoir.

According to one aspect of the present disclosure, a method may be provided and may include providing lubricant to a gearbox from a first pumping element at a first flow rate, wherein the lubricant is provided to the gearbox from a first a reservoir; and providing the lubricant to the gearbox from a second pumping element at a second flow rate, wherein the lubricant is provided to the gearbox from a second reservoir that is interconnected with the first reservoir, and the gearbox is associated with a rotor system of an aircraft. The first flow rate may be greater than the second flow rate. In some cases, providing the lubricant to the gearbox from the first pumping element may include providing the lubricant to the gearbox for a first period of time, and providing the lubricant to the gearbox from the second pumping element may include providing the lubricant to the gearbox for a second period of time. In some cases, at least a first portion of the first period of time and the second period of time may overlap and at least a second portion of the first period of time and the second period of time may not overlap.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1A:
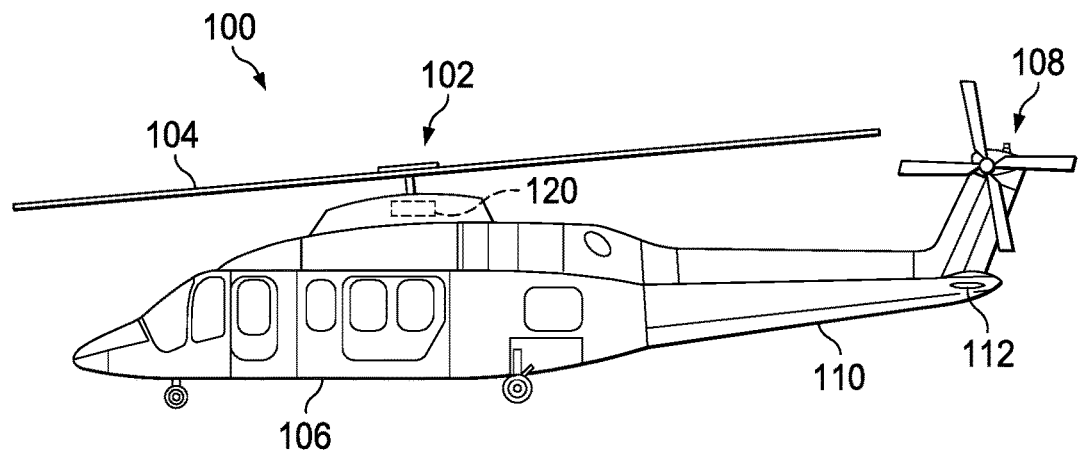
FIGS. 1A-1B are simplified schematic diagrams of an example aircraft, in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as 'above', 'below', 'upper', 'lower', 'top', 'bottom' or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase "between X and Y" represents a range that includes X and Y.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 1B:
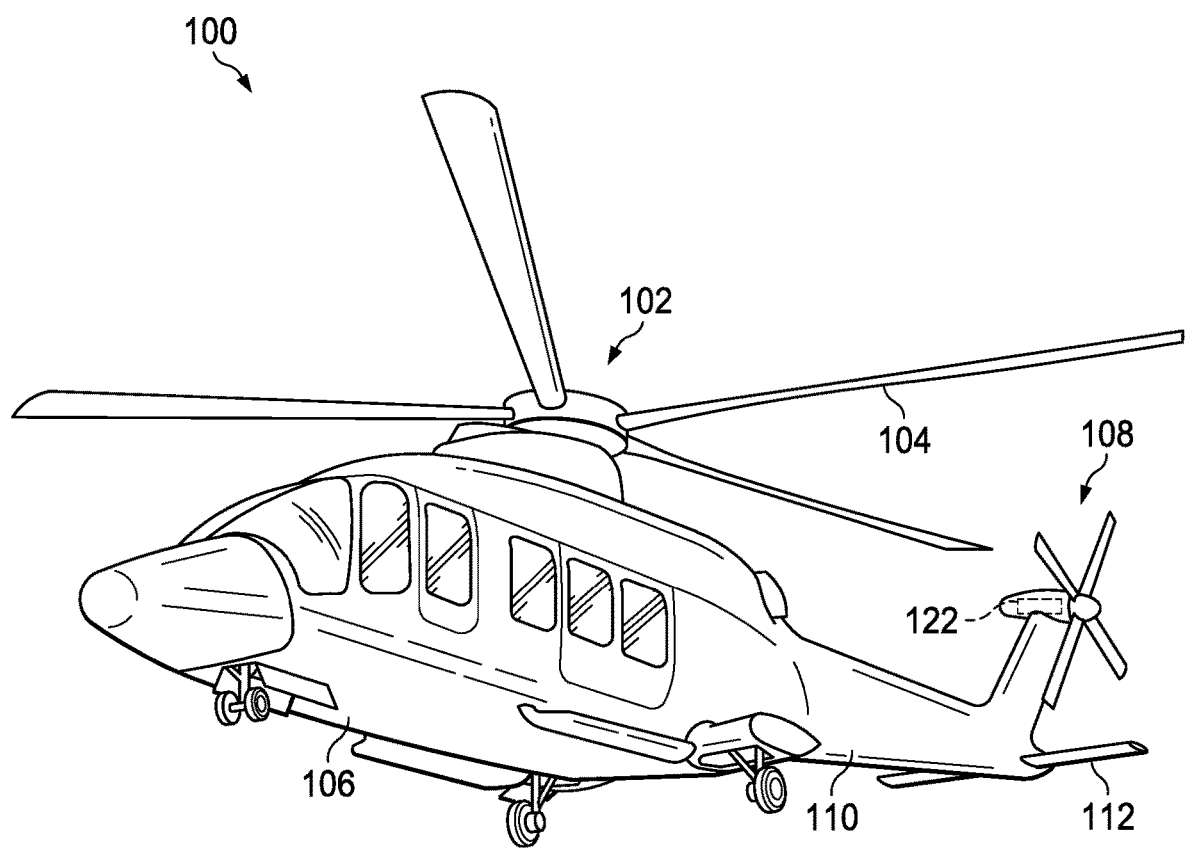

FIGS. 1A-1B illustrate an example embodiment of a rotorcraft 100. FIG. 1A portrays a side view of rotorcraft 100, while FIG. 1B portrays an isometric view of rotorcraft 100. Rotorcraft 100 includes a rotor system 102 with a plurality of rotor blades 104. The pitch of each rotor blade 104 can be managed or adjusted in order to selectively control direction, thrust, and lift of rotorcraft 100. Rotorcraft 100 further includes a fuselage 106, a tail rotor or anti-torque system 108, an empennage 110, and a tail structure 112. In the illustrated embodiment, tail structure 112 may be used as a horizontal stabilizer. Torque is supplied to rotor system 102 and anti-torque system 108 using at least one engine and at least one gearbox. At least one gearbox 120, which may be associated with rotor system 102, is illustrated in the embodiment of FIG. 1A. In some embodiments, anti-torque system 108 may also include an associated at least one gearbox 122, as illustrated in the embodiment of FIG. 1B.

Figure 2:
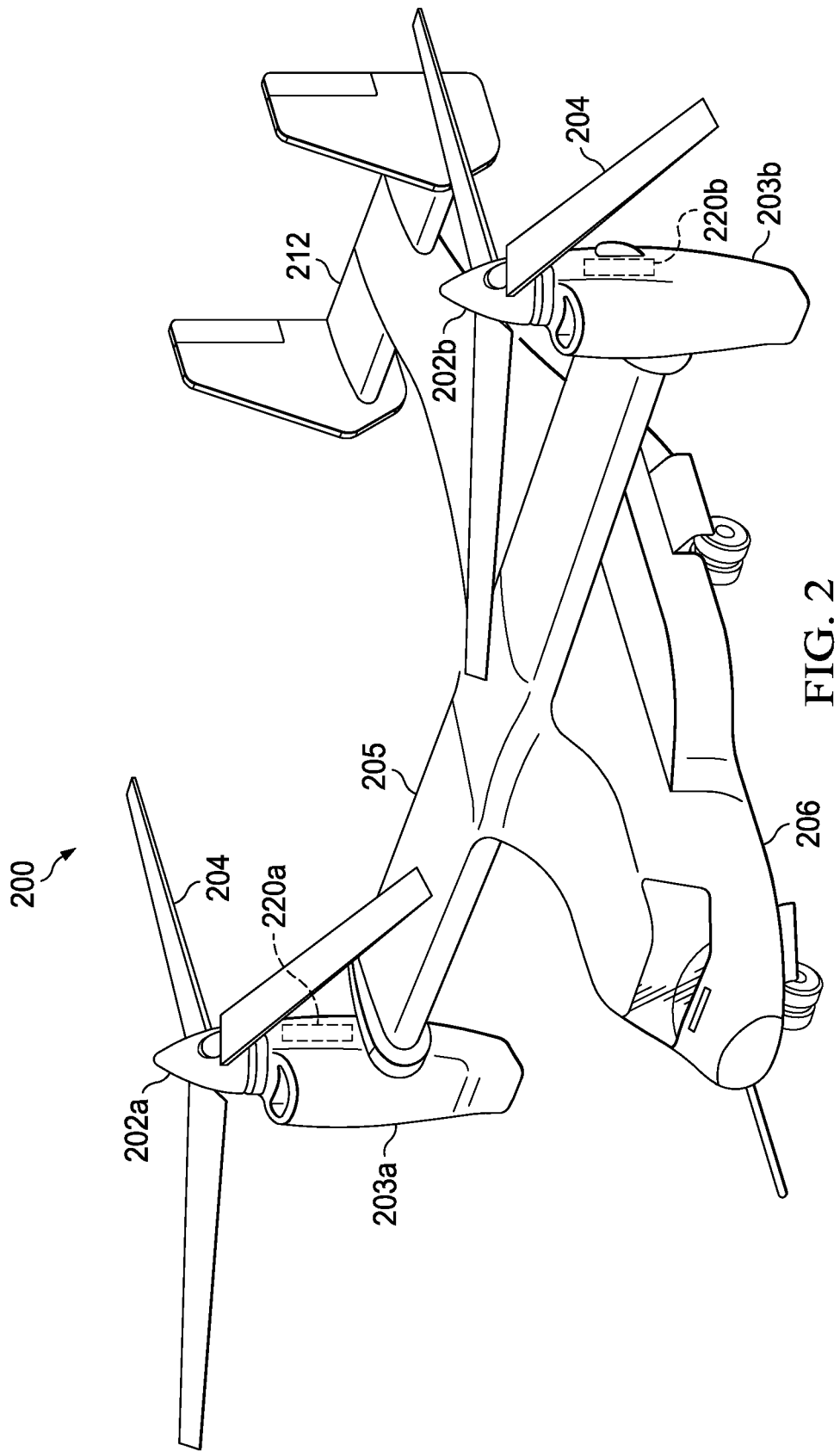
FIG. 2 is a simplified schematic diagram of another example aircraft, in accordance with certain embodiments.

FIG. 2 illustrates a perspective view of an example tiltrotor aircraft 200. Tiltrotor aircraft 200 includes nacelles 203a and 203b, a wing 205, a fuselage 206, and a tail structure 212. Nacelles 203a and 203b respectively include rotor systems 202a and 202b, and each rotor system 202a and 202b includes a plurality of rotor blades 204. Moreover, each nacelle 203a and 203b, respectively, may include an engine and at least one gearbox (e.g., gearbox 220a and gearbox 220b, respectively) for driving rotor systems 202a and 202b, respectively. In some embodiments, nacelles 203a and 203b may each be configured to rotate between a helicopter mode, in which the nacelles 203a and 203b are approximately vertical, and an airplane mode, in which the nacelles 203a and 203b are approximately horizontal. In the illustrated embodiment, tail structure 212 may be used as a vertical stabilizer.

It should be appreciated that rotorcraft 100 of FIGS. 1A-1B and tiltrotor aircraft 200 of FIG. 2 are merely illustrative of a variety of aircraft that can be used to implement embodiments of the present disclosure. Other aircraft implementations can include, for example, fixed wing airplanes, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

During operation of an aircraft, lubrication for a gearbox is provided by a lubrication system, which pumps lubricant (e.g., oil) through the gearbox to lubricate and help cool gears within the gearbox. The lubrication system can include a lubricant reservoir (e.g., a tank) and a pumping element to pump lubricant through the gearbox in a closed loop system in which the lubricant is pumped into the gearbox from the reservoir and recovered from the gearbox to refill the reservoir using a system of hoses.

In some cases, the lubrication system may fail during what is typically referred to as a loss of lubrication (LOL) event in which lubricant for the lubrication system may be lost (e.g., lubricant is drained from the system). Different types of LOL events may occur during aircraft operation including, but not limited to, a hose may burst; a hose and/or lubricant reservoir may become punctured; a hose, port, fitting, etc. may become obstructed (e.g., kinked, twisted, clogged, etc.); a pump may fail, etc. During a LOL event, a gearbox may be expected to continue to operate to provide torque to a rotor system for a predetermined period of time. In some instances, the period of time that a gearbox may be expected to operate may be 30 minutes, although other time periods (greater than or less than) 30 minutes may be expected. During the predetermined period of time, it may be expected that the rotor system experiences no loss of torque being supplied by the gearbox.

Some gearboxes may be designed to continue to operate during a LOL event for the predetermined period of time without a flow of lubricant being provided to the gearbox; however, in some instances, such gearbox designs may not be feasible due to cost, system requirements, etc. Thus, an emergency lubrication system may be needed to provide lubricant to a gearbox that is not designed to operate without lubricant during a LOL event. Some current solutions for providing lubricant to a gearbox during a LOL event may include providing an emergency lubrication system that is separate from a primary lubrication system for the gearbox. For such solutions, the separate emergency lubrication system can include its own emergency lubricant reservoir and emergency pumping element that is not shared with a primary reservoir and primary pumping element of the primary lubrication system.

While the primary lubrication system is operational and no LOL event occurs, the emergency lubrication system typically remains in an inactive state in which the emergency pump does not operate and the lubricant in the emergency reservoir is not used to lubricate the gearbox. During a LOL event, the emergency lubrication system can be switched to an active state in which the lubricant in the emergency reservoir can be pumped into the gearbox using the emergency pumping element and a system of hoses, which may enable the gearbox to continue to operate for a predetermined period time.

There are several drawbacks with lubrication systems that utilize a main lubrication system (that includes a main pumping element and a main reservoir) and a separate emergency lubrication system (that includes a separate emergency pumping element and a separate emergency reservoir). One drawback is that the separate emergency lubrication system remains in an inactive state until a LOL event occurs. The separate emergency lubrication system can be switched to an active state only after an LOL event has been identified, either by a human operator or a control system. In the time that elapses to identify that an LOL event has occurred and to switch the separate emergency lubrication system to an active state, either by a human operator or a control system, gears in the gearbox accrue damage, thereby shortening the life of the gears, or may fail causing a significant (if not complete) loss of torque to the rotor system. Further, the need for a switching system and/or LOL event determination system (to identify a LOL event) can add to the complexity and/or cost of providing such a separate emergency lubrication system. Another drawback is that because the separate emergency lubrication system remains in an inactive state until a LOL event is identified, lubricant in the separate emergency reservoir typically needs to be continuously heated to reduce viscosity of the lubricant in the separate emergency reservoir so that it may effectively be pumped to the gearbox during a potential LOL event. The need for continuous heating can even further add to the complexity and/or cost of such a separate emergency lubrication system.

The present disclosure describes various embodiments for providing a lubrication system for an aircraft gearbox in which lubricant may be provided to the gearbox from both a primary pumping element and a secondary (e.g., emergency) pumping element that may each continuously pump the lubricant from one or more interconnected lubricant reservoirs that can share the lubricant. For example, both the primary pumping element and the secondary pumping element may be continuously running during normal operation and during a LOL event to provide lubricant to the gearbox using a system of hoses. Different lubricant reservoir configurations may be provided for the lubrication system in accordance with various embodiments. In some embodiments, a lubricant reservoir configuration may include a primary lubricant reservoir having a first volume and a separate secondary lubricant reservoir having a second volume in which the primary and secondary lubricant reservoirs may be interconnected to share lubricant for a lubrication system. The first volume of the primary lubricant reservoir may be greater than the second volume of the secondary lubricant reservoir. In other embodiments, a lubricant reservoir configuration may include a common lubricant reservoir that may be internally bifurcated to provide a primary reservoir portion having a first volume and a secondary reservoir portion having a second volume. The first volume of the primary reservoir portion may be greater than the second volume of the secondary reservoir portion. In various embodiments, the internal bifurcation can be configured as one or more internal partitions and/or partition portions that may provide for interconnecting the primary reservoir portion with the secondary reservoir portion internally within the common lubricant reservoir.

As referred to herein in this Specification, a 'primary reservoir' for a lubricant reservoir configuration including shared lubricant reservoirs or a 'primary reservoir portion' for a lubricant reservoir configuration including a common lubricant reservoir, either of which may be implemented for lubrication systems discussed for various embodiments described herein, may be referred to using the term 'primary reservoir/reservoir portion'. Further as referred to herein in this Specification, a 'secondary reservoir' for a lubricant reservoir configuration including shared lubricant reservoirs or a 'secondary reservoir portion' for a lubricant reservoir configuration including a common lubricant reservoir, either of which may be implemented for lubrication systems discussed for various embodiments described herein, may be referred to using the term 'secondary reservoir/reservoir portion'.

In various embodiments, the primary pumping element may pump lubricant from the primary reservoir/reservoir portion at a first flow rate and the secondary pumping element may pump lubricant from the secondary reservoir/reservoir portion at a second flow rate in which the first flow rate is greater than the second flow rate. In some embodiments, the first flow rate may be orders of magnitude greater than the second flow rate (e.g., the first flow rate may be 25 gallons per minute (gpm) while the second flow rate may be 0.1 gpm, in some implementations).

During normal operation, the common lubricant reservoir (including the primary reservoir and the secondary reservoir portions) or the shared lubricant reservoirs may be refilled with lubricant recirculated from the gearbox. During a LOL event in which the common reservoir or shared reservoirs may, for example, stop being refilled, the primary pumping element may continue to pump lubricant from the primary reservoir/reservoir portion at the first flow rate for a first predetermined period of time until lubricant in the primary reservoir/reservoir portion is depleted and the secondary pumping element may continue to pump lubricant from the secondary reservoir/reservoir portion at the second flow rate for a second predetermined period of time until lubricant in the secondary reservoir/reservoir portion is depleted.

The second period of time associated with the secondary pumping element can be divided into an overlapping period of time in which operation of the secondary pumping element overlaps with the first period of time associated with the primary pumping element (e.g., lubricant is being provided to the gearbox from both the primary reservoir/ reservoir portion and the secondary reservoir/reservoir portion) and a non-overlapping period of time in which operation of the secondary pumping element continues to provide lubricant to the gearbox after lubricant from the primary reservoir/reservoir portion is depleted.

In at least one embodiment, the non-overlapping period of time associated with the lubricant provided by the secondary pumping element alone may represent the LOL time period for which lubricant may be provided to the gearbox during a LOL event. Upon determining a flow rate that is critical to sustain operation of a given gearbox during a LOL event, the lubrication system can be designed such that the primary pumping element, the secondary pumping element, and the common reservoir, including the primary reservoir portion and the secondary reservoir portion can be suitably sized (e.g., to provide associated flow rates, volumes, etc.) such that sustained operation of the gearbox may be provided for a predetermined time period (e.g., 30 minutes).

In another example in which the secondary pumping element may fail but the primary reservoir portion of the common reservoir or the primary reservoir for shared reservoirs may continue to be filled and the primary pumping element may continue to operate, the lubrication system may continue to operate via the primary pumping element to provide lubricant to cool and lubricate the gearbox. In this example, a sensor (e.g., a low-pressure sensor) could indicate a failure associated with pumping lubricant from the secondary reservoir/reservoir portion, which may alert an operator that the secondary pumping system may be compromised.

Embodiments described throughout this disclosure may provide numerous technical advantages including, but not limited to, reducing complexities and/or costs typically associated with a providing a primary lubrication system and a separate emergency lubrication system; removing the need to identify an LOL event (e.g., either by a human operator or a control system) and further to switch (e.g., either manually or electronically via a control system) a separate emergency lubrication system from an inactive state to an active state; and/or removing the need to include an oil heater for a separate emergency lubrication system. Embodiments described herein may include a lubrication system that includes a secondary pumping element that continuously operates along with a primary pumping element to provide, via one or more lubricant reservoirs and a system of hoses, lubricant to a gearbox both during normal operation and during a LOL event without the need to switch the secondary pumping element to an active state and/or without the need to heat the lubricant reservoir.

Example embodiments that may be used to implement an emergency lubrication system are described below with more particular reference to the remaining FIGURES.

Figure 3:
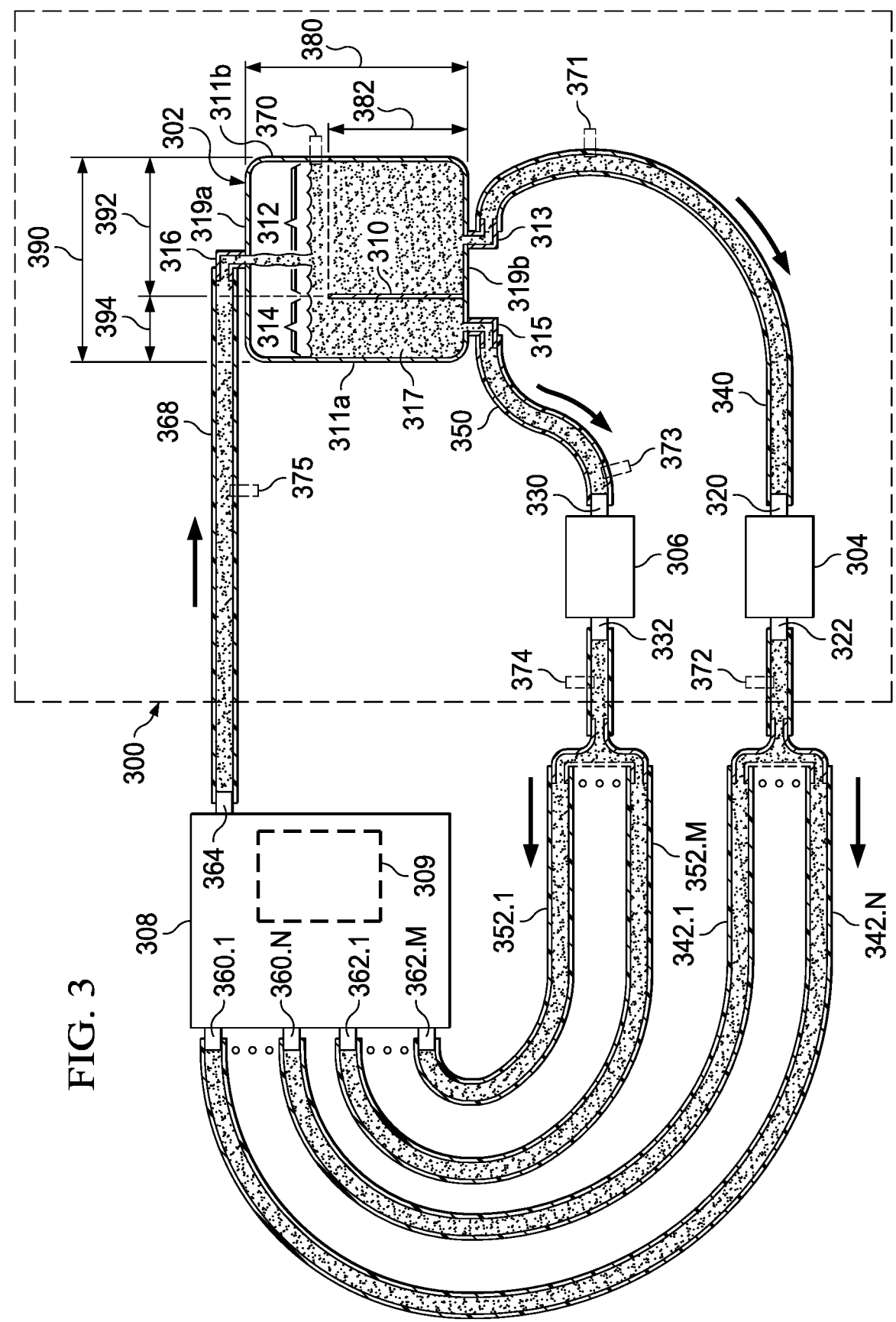
FIG. 3 is a simplified schematic diagram of an example lubrication system that may be used in an aircraft, in accordance with certain embodiments.

FIG. 3 is a simplified schematic diagram illustrating an example lubrication system 300 that may be used in an aircraft (e.g., rotorcraft 100, tiltrotor aircraft 200, etc.) in accordance with at least one embodiment of the present disclosure. In at least one embodiment, lubrication system 300 may include a lubricant (e.g., oil) reservoir 302, a primary pumping element (PPE) 304, and a secondary pumping element (SPE) 306. The lubricant reservoir 302, the PPE 304 and the SPE 306 may be coupled to at least one gearbox 308 using a system of hoses, discussed in further detail below. The at least one gearbox 308 may include a number of gears 309 housed therein. In some instances, the terms 'gearbox' and 'gearbox case' may be used interchangeably herein in this Specification.

It is to be understood that the lubrication system 300 can provide lubricant 317 to multiple gearboxes in accordance with various embodiments; however, for the sake of brevity only one gearbox 308 is illustrated in the embodiment of FIG. 3. Further, it is to be understood that the gearbox 308 may be coupled between at least one engine and a rotor system; however, for the sake of brevity, these elements are not illustrated in the embodiment of FIG. 3. Many of the elements of the lubrication system 300 of FIG. 3 are included in other ones of the accompanying figures; the discussion of these elements is not repeated when discussing these figures and any of these elements may take any of the forms disclosed herein.

The lubricant reservoir 302 may include an internal partition 310, a primary reservoir portion 312 (e.g., a primary silo) that may feed lubricant 317 to a primary discharge port 313, a secondary reservoir portion 314 (e.g., a secondary or emergency silo) that may feed lubricant to a secondary discharge port 315, and at least one supply port 316 that may be provided at a location that may supply (under normal operating conditions) lubricant 317 to refill both the primary reservoir portion 312 and the secondary reservoir portion 314. Although the embodiment of FIGS. 3, 4A-4B, and 5 discussed herein illustrate a lubricant reservoir configuration in which a common lubricant reservoir (302) including an internal partition (310) is provided, it is to be understood that any lubricant reservoir configuration, which can include separate interconnected reservoirs or a common internally interconnected reservoir (as shown in FIG. 3) may be provided for a lubrication system, in accordance with various embodiments. Other potential lubricant reservoir configurations that may be provided in accordance with embodiments of the present disclosure are discussed herein with reference to FIGS. 7-10.

In at least one embodiment, the gearbox 308 may include an 'N' number of primary inlet ports 360.1-360.N through which to receive lubricant from the PPE 304 and an 'M' number of secondary inlet ports 362.1-262.M through which to receive lubricant from the SPE 306. The number of primary inlet ports 360.1-360.N may be greater than the number of secondary inlet ports 362.1-362.M as the number overall number of gears of the gearbox for which lubrication and cooling may be provided during normal operation may be greater than the subset of gears of the gearbox for which lubrication may be provided during a LOL event. The subset of gears to which lubrication may be provided during a LOL event may be determined to be gears that may be critical to maintain operation of the gearbox 308 for the expected period of time (e.g., 30 minutes) and/or may be determined to be gears that may be more sensitive operating with a lack of lubrication. The gearbox 308 may further include at least one outlet port 364. At least one recovery hose 368 may be coupled to the at least one outlet port 364 of the gearbox 308 and to the supply port 316 of the lubricant reservoir 302.

The PPE 304 may include at least one suction port 320 and at least one discharge port 322. The SPE 306 may include at least one suction port 330 and at least one discharge port 332. As noted previously, the lubrication system 300 may include a system of hoses to interconnect the lubricant reservoir 302, the PPE 304, the SPE 306, and the gearbox 308. In at least one embodiment, the lubrication system 300 may further include at least one primary suction hose 340 coupled to the primary discharge port 313 associated with the primary reservoir portion 312 and to the at least one suction port 320 of the PPE 304. A number of primary discharge hoses 342.1-342.N may be coupled to the at least one discharge port 322 of the PPE 304 and to the corresponding number of primary inlet ports 360.1-360.N of the gearbox 308. In various embodiments, the primary discharge hoses 342.1-342.N may be teed or otherwise branched-off from a single hose coupled to the discharge port 322 of the PPE 304. The lubrication system 300 may further include at least one secondary suction hose 350 coupled to the secondary discharge port 315 associated with the secondary reservoir portion 314 and to the at least one suction port 330 of the SPE 306. A number of secondary discharge hoses 352.1-352.M may be coupled to the at least one discharge port 332 of the SPE 306 and to the corresponding number of secondary inlet ports 362.1-362.M of the gearbox 308. In various embodiments, the secondary discharge hoses 352.1-352.M may be teed or otherwise branched-off from a single hose coupled to the discharge port 332 of the SPE 306. In various embodiments, the PPE 304 and the SPE 306 may be rotary pumps (e.g., gerotor pumps, vane pumps, etc.), gear pumps, or the like.

As referred to herein in this Specification, a hose may include a tube or any other element or means capable of carrying lubricant between various elements of the lubrication system 300. In various embodiments, a hose may be composed of any suitable material including, but not limited to, aluminum, stainless steel, polytetrafluoroethylene core with a stainless steel braided sheath, etc. and hose interconnections may be provided using any suitable means, including but not limited to, compression couplings, threaded fittings, etc.

The lubricant reservoir 302 may have any suitable dimensions and may be enclosed to prevent loss of the lubricant 317. For example, in at least one embodiment, the lubricant reservoir 302 may include a set of outer vertical walls 311a, 311b positioned opposite each other (e.g., a left outer wall and a right outer wall) to provide an overall height 380 for the lubricant reservoir 302. Other vertical walls that may be present are discussed in further detail below with reference to FIG. 6.

In at least one embodiment, the internal partition 310 may be provisioned in a vertical configuration inside the lubricant reservoir 302 such that the partition 310 may be substantially parallel with the outer vertical walls 311a, 311b of the lubricant reservoir 302. The internal partition 310 may be provisioned to have a height 382 that may be less than the overall height 380 of the lubricant reservoir 302; thus, the primary reservoir portion 312 and the secondary reservoir portion 314 may be internally interconnected within the lubricant reservoir 302. In at least one embodiment, the lubricant reservoir 302 may include outer horizontal walls 319a, 319b positioned opposite each other (e.g., a top outer wall and a bottom outer wall) to provide an overall width 390 for the lubricant reservoir 302. The primary reservoir portion 312 may have a first width 392 that may be less than the overall width 390 of the lubricant reservoir 302, and the secondary reservoir portion 314 may have a second width 394 that may be less than the first width 392 of the primary reservoir portion 312. In some embodiments, the lubricant reservoir 302 and the internal partition 310 may have a thickness (not labeled) between 0.06 centimeters and 0.20 centimeters. Example details related to various lengths that may be associated with a lubricant reservoir are discussed in further detail below with reference to FIG. 6.

It is to be understood that configuration of the example lubricant reservoir 302 illustrated for the embodiment of FIG. 3 is only one of the many potential configurations that may be provided for a lubricant reservoir in accordance with embodiments of the present disclosure. For example, although lubricant reservoir 302 illustrated for the embodiment of FIG. 3 has a substantially rectangular shape, in some embodiments, a lubricant reservoir may be provisioned for the lubrication system 300 having a substantially cylindrical shape, a polygonal shape, or an irregular shape that may combine or may not combine any combination of cylindrical, rectangular, and/or polygonal shapes. Thus, it is to be understood that any shape or combination of shapes for a lubricant reservoir configuration is considered to be within the scope of the teachings of the present disclosure.

In various embodiments, the lubricant reservoir 302 may be provisioned to hold an overall volume of lubricant 317 that may vary over a wide range of volumes (e.g., a few ounces to hundreds of gallons). The various volumes for the lubricant reservoir 302, the primary reservoir portion 312, and the secondary reservoir portion 314 may vary based on design and/or implementation (e.g., the number of gears that may be needed to lubricate and/or cool under normal operation and/or during a LOL event, flow rates needed to lubricate and/or cool the gears, revolutions per minute (rpms) needed to provide torque under normal operation and/or during a LOL event, the predetermined period of time that the gearbox is expected to operate during a LOL event, etc.) and may be adjusted by altering the overall dimensions of the lubricant reservoir 302 as well as the height 382 and internal placement of the internal partition 310 (e.g., based on the overall width 390 of the lubricant reservoir 302). In at least one embodiment, lubricant reservoir 302 may be a pressure vessel capable of storing lubricant 317 at pressures between 10 pounds per square inch (psi) to 15 psi. In various embodiments, the lubricant reservoir 302 may be composed of any suitable materials, including, but not limited to metals (e.g., steel, aluminum, alloys thereof, etc.), composites (e.g., carbon, fiberglass, etc.), or any combination thereof or the like.

In some embodiments, lubricant reservoir(s) provided for a lubrication system may be configured separate from a gearbox associated with the lubrication system (e.g., the lubricant reservoir(s) may be made of sheet metal); however, in other embodiments, lubricant reservoir(s) may be configured as integrated into the gearbox case (e.g., the gearbox case and the lubricant reservoir(s) may be made integrated together using cast aluminum).

In various embodiments, a number of sensors 370-375 may be included in the lubrication system 300, which may detect various operating conditions including, but not limited to, pressure, temperature, volume, flow rate, combinations thereof or the like. For example, in at least one embodiment, at least one reservoir sensor 370 may be provided for the lubricant reservoir 302 to detect various operating conditions including, but not limited to, detecting various lubricant 317 level(s) in the reservoir, detecting various lubricant temperatures, etc. In at least one embodiment, at least one suction hose sensor 371 may be provided for the primary suction hose 340 to detect various operating conditions that may be associated with the hose including, but not limited to, detecting flow rate, temperature, pressure, etc. of lubricant 317 that may be flowing through the hose 340. In at least one embodiment, at least one discharge hose sensor 372 may be provided for one or more of the primary discharge hoses 342.1-342.N to detect various operating conditions that may be associated with the hoses. In at least one embodiment, the at least one discharge hose sensor 372 may be used to indicate whether a LOL event may have occurred (e.g., a loss of pressure associated with the PPE 304 may indicate that a LOL event has occurred). In at least one embodiment, at least one suction hose sensor 373 may be provided for the secondary suction hose 350 to detect various operating conditions that may be associated with the hose 350. In at least one embodiment, at least one discharge hose sensor 374 may be provided for one or more of the secondary discharge hoses 352.1-352.M to detect various operating conditions that may be associated with the hoses. In at least one embodiment, the at least one discharge hose sensor 374, may be used to indicate whether a failure associated with the SPE 306 may have occurred. In at least one embodiment, at least one recovery hose sensor 375 may be provided for the recovery hose 368 to detect various operating conditions that may be associated with the hose 368 and/or lubricant recirculated from the gearbox 308.

It is to be understood that any combination of sensors (e.g., sensors 370-375) may or may not be included in a lubrication system (e.g., lubrication system 300) in order to detect various operating conditions associated with the system. In some embodiments, the sensors may be used to determine whether a potential LOL event has occurred and an operator (e.g., a human operator, computer system, combinations thereof, or the like) may be alerted of the potential LOL event. However, whether an LOL event may or may not occur, PPE 304 and the SPE 306 may continuously operate to provide lubricant 317 to the gearbox 308 (until lubricant may be depleted from the primary reservoir portion and the secondary reservoir portion) in accordance with various embodiments, as described here.

In at least one embodiment during operation of an aircraft under normal conditions (e.g., not during a LOL event), both the PPE 304 and the SPE 306 may continuously operate to provide (using the system of hoses discussed herein) lubricant 317 to the gearbox 308 from the lubricant reservoir 302 and the reservoir may be refilled with lubricant 317 received from the gearbox 308 via the recovery hose 368. The PPE 304 may provide lubricant 317 to the gearbox 308 at a first flow rate and the SPE 306 may provide lubricant 317 to the gearbox 308 at a second flow rate. In various embodiments, the first flow rate of the PPE 304 may be orders of magnitude greater than the second flow rate of the SPE 306. In some embodiments, the first flow rate of the PPE 304 may range between 3 gpm and 50 gpm. In some embodiments, the second flow rate of the SPE 306 may range between 0.1 and 0.5 gpm. Other flow rates may be envisioned based on application and/or implementation. In some embodiments, the first flow rate of the PPE 304 may be at least ten times greater than the second flow rate of the SPE 306.

In at least one embodiment, the lubrication system 300 may be configured within a wing of a tiltrotor aircraft (e.g., wing 205 of tiltrotor aircraft 200). In some embodiments, multiple lubrication systems 300 may be provided for a tiltrotor aircraft. For example, in some embodiments a first lubrication system (e.g., a first iteration of lubrication system 300) may be configured in a first portion of the wing nearest a first nacelle (e.g., nearest to nacelle 203a) of a tiltrotor aircraft and a second lubrication system (e.g., a second iteration of lubrication system 300) may be configured in a second portion of the wing nearest a second nacelle (e.g., nearest to nacelle 203b) of the tiltrotor aircraft.

In some cases, a LOL event may occur in which the lubricant reservoir 302 stops being refilled. Various example details that may be associated with an example LOL event are discussed below with reference to FIGS. 4A-4B.

Figure 4A:
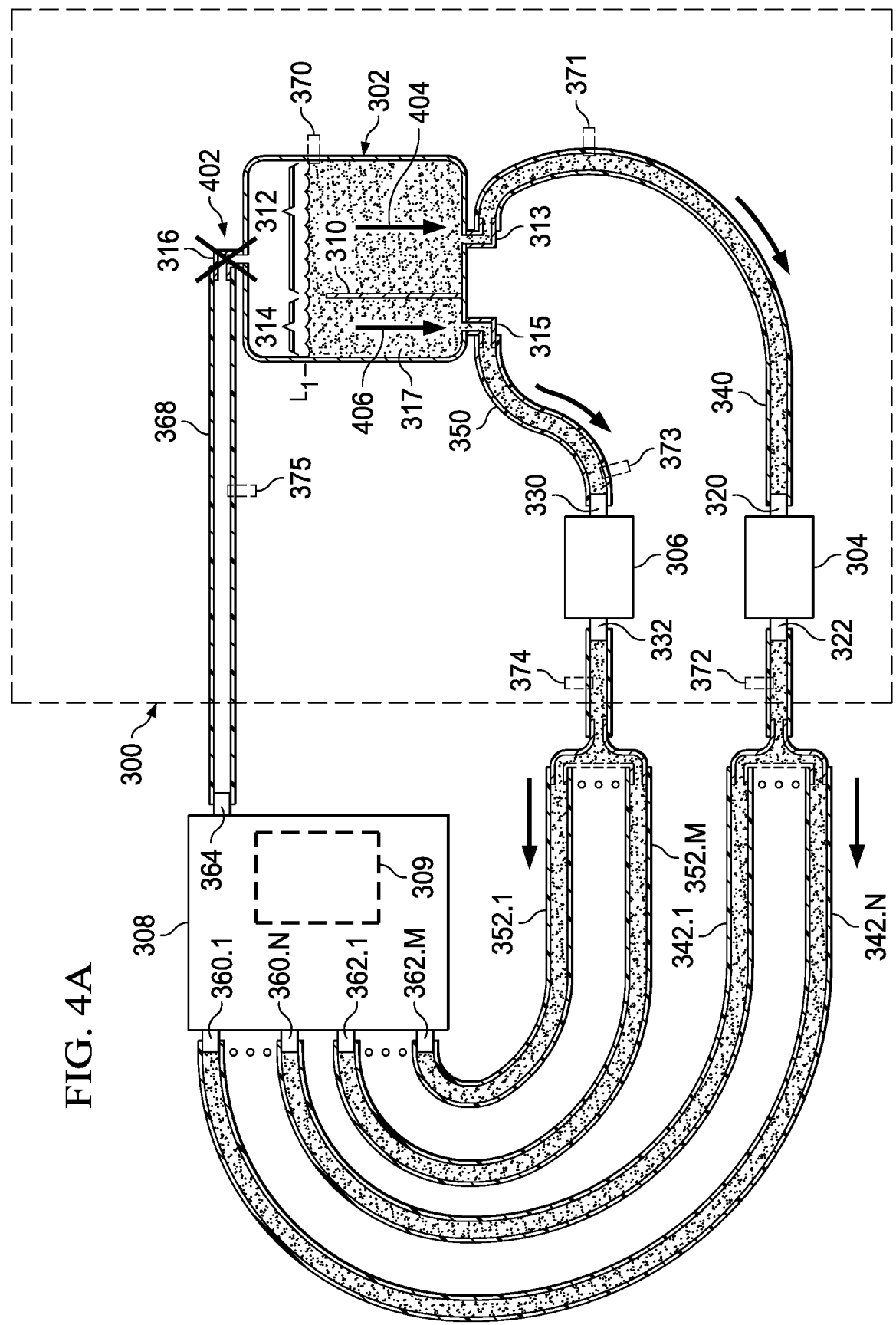
FIGS. 4A-4B are simplified schematic diagrams illustrating example details that may be associated with the lubrication system of FIG. 3 during a loss of lubrication event, in accordance with certain embodiments.

Referring to FIG. 4A, consider for example, an occurrence of an example LOL event in which the lubricant reservoir 302 stops being refilled (402); thus, some amount of lubricant 317 is being lost from the lubrication system 300. Consider for the present example that the lubricant 317 within the lubricant reservoir is at a first level $L_1$ at the start of the example LOL event. During the example LOL event, the PPE 304 may continue to pump lubricant 317 from the primary reservoir portion 312 at the first flow rate; thereby, draining (404) lubricant from the primary reservoir portion 312 according to the first flow rate. The SPE 306 may also continue to pump lubricant 317 from the secondary reservoir portion 314 at the second flow rate; thereby draining (406) lubricant 317 from the secondary reservoir portion 314 according to the second flow rate.

As noted for various embodiments described herein, the first flow rate of the PPE 304 may be greater than the second flow rate of the SPE 306; thus, the primary reservoir portion 312 may be drained faster than the secondary reservoir portion 314 may be drained. The PPE 304 may drain (404) the lubricant 317 from the primary reservoir portion 312 over a first time period and the SPE may drain (406) the lubricant 317 from the secondary reservoir portion 314 over a second time period during a LOL event. As discussed above, a portion of the second time period over which the SPE 306 drains (406) lubricant 317 from the secondary reservoir portion 314 may overlap with the first time period that lubricant 317 is drained from the primary reservoir portion 312; thus, when the lubricant 317 is depleted from the primary reservoir portion 312, the lubricant 317 may be at a second, lower level within the secondary reservoir portion 314.

Figure 4B:
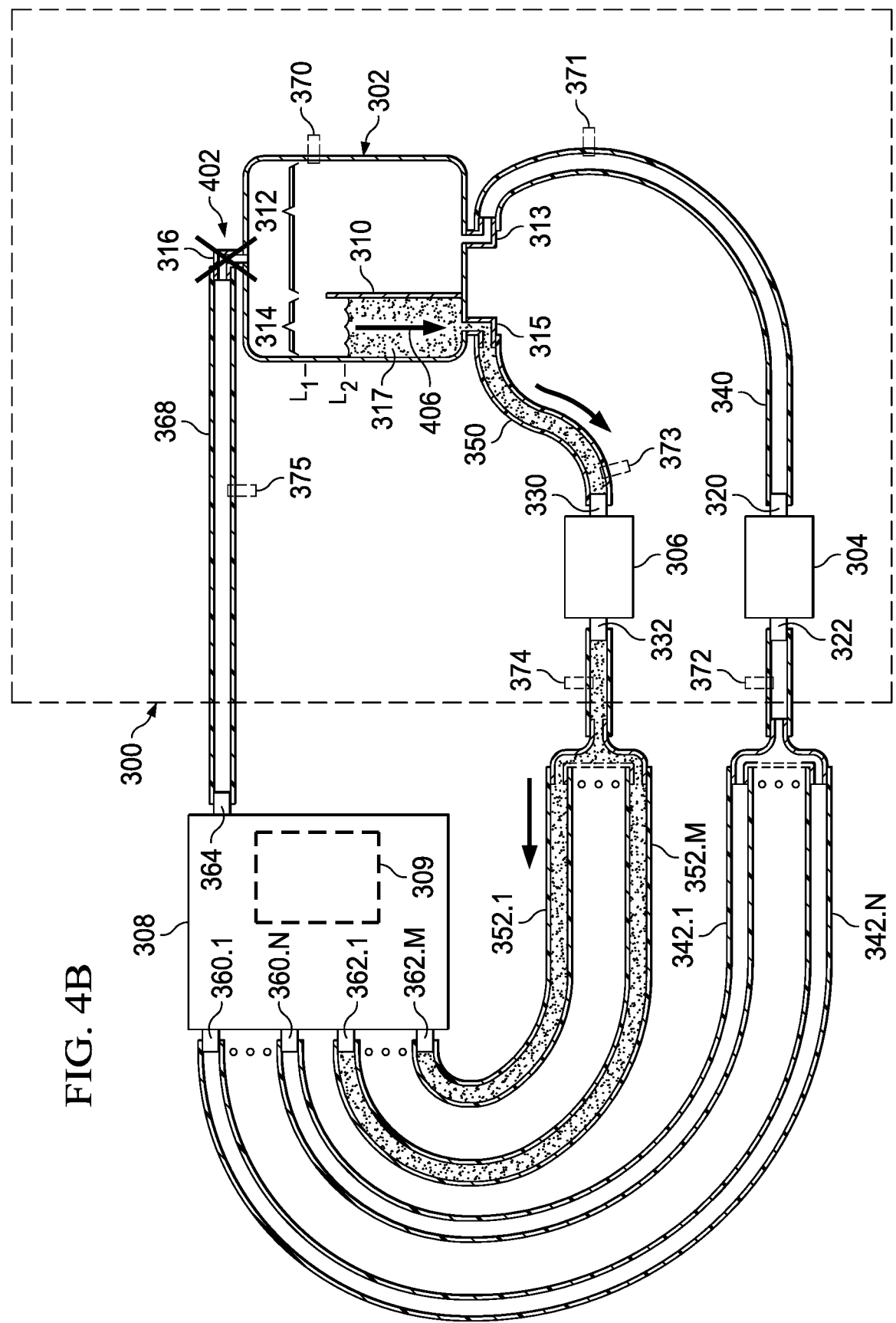

Referring to FIG. 4B, consider that all the lubricant 317 has been pumped from the primary reservoir portion 312 over the first time period such that the primary reservoir portion 312 is empty. During the overlapping portion of the first and second time periods, lubricant 317 has also been pumped from the secondary reservoir portion 314 such that the lubricant within the secondary reservoir portion 314 is at a second level $L_2$ that is less than the first level $L_1$. For the non-overlapping portion of the second time period, the SPE 306 may continue to provide lubricant 317 to the gearbox 308 from the secondary reservoir portion 314 at the second flow rate; thereby, continuing to drain (406) lubricant from the secondary reservoir portion 314 at the second flow rate.

In various embodiments, the non-overlapping period of time associated with the lubricant 317 provided by the SPE 306 may represent the LOL time period for which lubricant 317 may be provided to the gearbox during a LOL event. Upon determining a flow rate that is needed to sustain operation of the gearbox 308 during a LOL event, the lubrication system 300 can be designed such that the PPE 304, the SPE 306, and the lubricant reservoir 302, including the primary reservoir portion 312 and the secondary reservoir portion 314 can be suitably sized (e.g., to provide associated flow rates, volumes, etc.) such that sustained operation of the gearbox 308 may be provided for a predetermined time period (e.g., 30 minutes).

Accordingly, lubrication system 300 may provide various advantages as discussed herein to provide gearbox lubrication during an LOL event for a predetermined period of time.

In some cases, a failure related to pumping performed by the SPE 306 may occur in which the lubricant 317 may not be pumped into the gearbox 308 from the secondary reservoir portion 314. Various example details that may be associated with an example failure related to the SPE 306 are discussed below with reference to FIG. 5.

Figure 5:
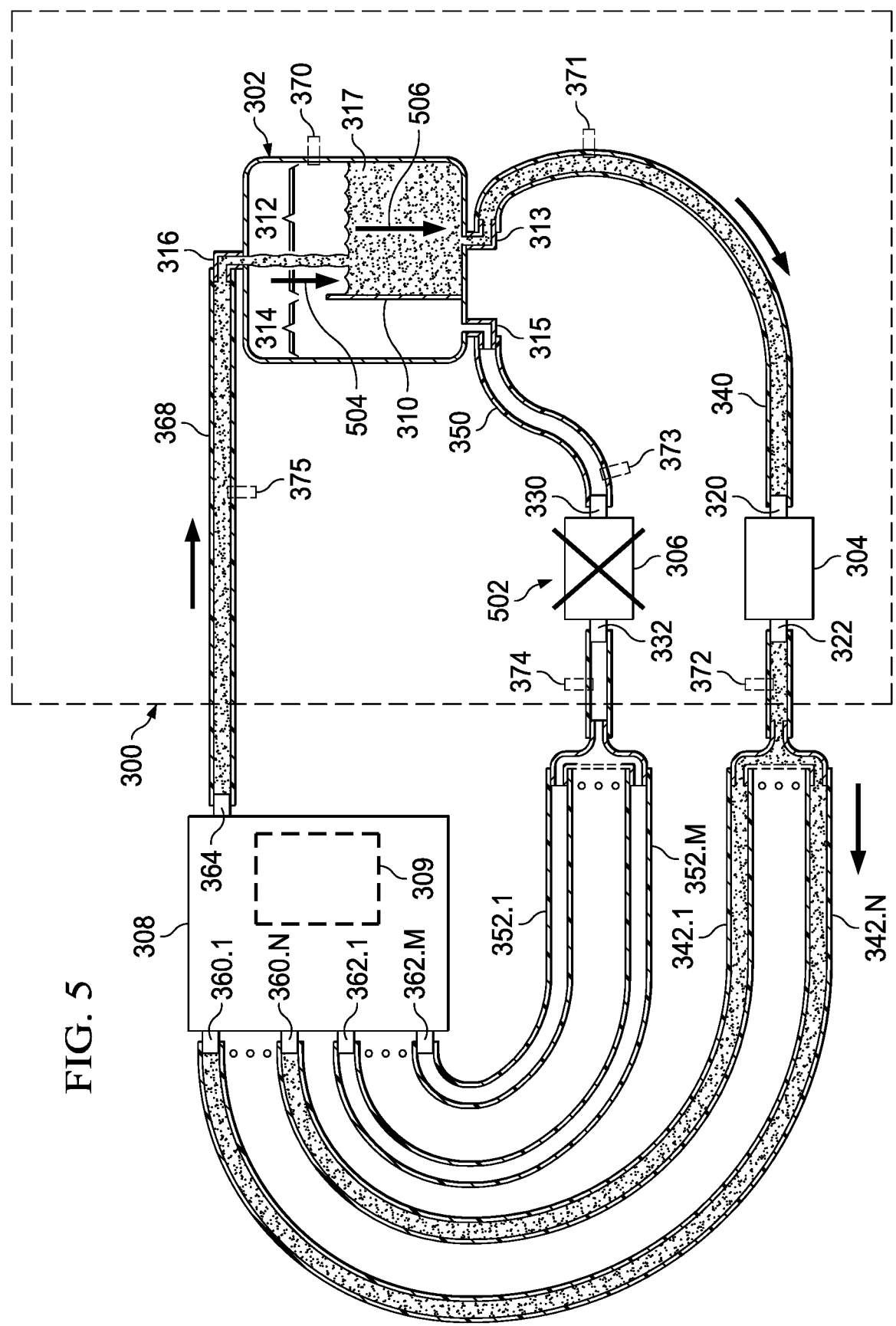
FIG. 5 is a simplified schematic diagram illustrating example details that may be associated with the lubrication system of FIG. 3 for a pumping element failure, in accordance with certain embodiments.

Referring to FIG. 5, consider any example in which a failure (502) occurs that is related to the pumping performed by the SPE 306 in which the SPE 306 stops pumping lubricant 317 from secondary reservoir portion 314. In an instance in which there is a failure (502) associated with the pumping performed by the SPE 306, the primary reservoir portion 312 may continue to be filled (504) and the PPE 304 may continue to pump lubricant 317 from the primary reservoir portion 312 at the first flow rate; thereby, draining (506) lubricant from the primary reservoir portion 312 according to the first flow rate. In at least one embodiment, the first flow rate associated with the pumping performed by the PPE 304 may be approximately equal to the flow rate at which the reservoir may be refilled (504).

Figure 6:
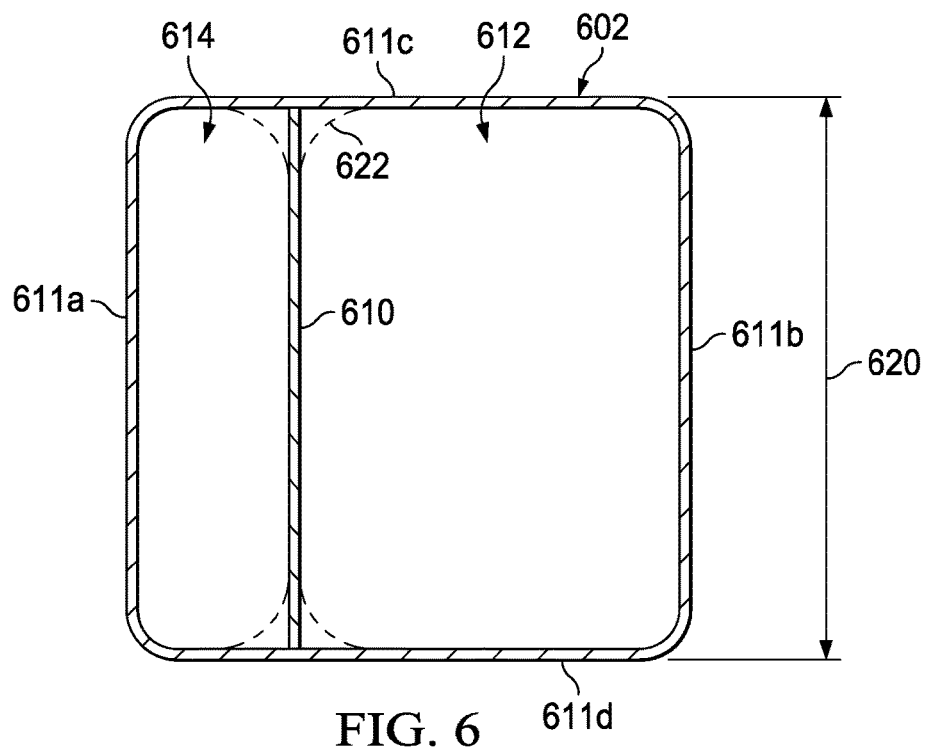
FIG. 6 is a top, cross-sectional view illustrating example details associated with an example lubricant reservoir configuration that may be used in a lubrication system, in accordance with certain embodiments.

As noted herein, the lubricant reservoir may have any suitable dimensions. Referring to FIG. 6, FIG. 6 is a top, cross-sectional view of an example lubricant reservoir configuration for an example lubricant reservoir 602 that may be used in a lubrication system (e.g., lubrication system 300 of FIGS. 3, 4A-4B, and 5), in accordance with certain embodiments. Various ports, including a supply port and discharge ports, and outer horizontal walls are not illustrated for the example lubricant reservoir 602 for the embodiment of FIG. 6; however, it is to be understood that such ports and/or outer horizontal walls may be configured for the lubricant reservoir 602 having any suitable dimensions at any suitable locations, in accordance with various embodiments.

As illustrated for the embodiment of FIG. 6, the lubricant reservoir 602 may include an internal partition 610 that may form a primary reservoir portion 612 and a secondary reservoir portion 614 for the reservoir 602. The internal partition 610 may, in some embodiments, have a length that may be equal to an overall length 620 of the lubricant reservoir 602. In some embodiments, the internal partition 610 may have a lateral shape that may be substantially parallel to one set of opposing outer vertical walls 611a, 611b of the lubricant reservoir 602 while being substantially perpendicular to another set of opposing outer vertical walls 611c, 611d of the lubricant reservoir. In other embodiments, the internal partition 610 may have a lateral shape that may include curvatures 622 (as illustrated by the dashed lines) at one or both ends of the internal partition 610. For embodiments, in which the internal partition 610 may include curvatures, the length of the partition may be greater than the overall length of the lubricant reservoir 602.

Figure 7:
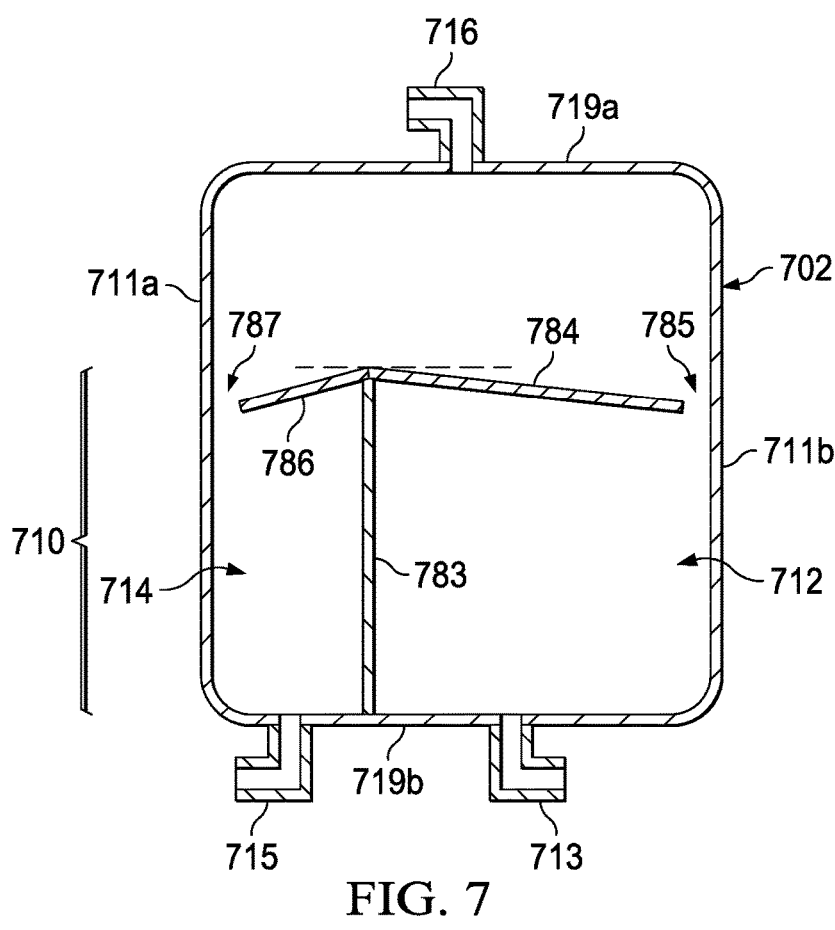
FIG. 7 is a side, cross-sectional view illustrating example details associated with another example lubricant reservoir configuration that may be used in a lubrication system, in accordance with certain embodiments.

Referring to FIG. 7, FIG. 7 is a side, cross-sectional view of another example lubricant reservoir configuration for an example lubricant reservoir 702 that may be used in a lubrication system (e.g., lubrication system 300 of FIGS. 3, 4A-4B, and 5), in accordance with certain embodiments. The embodiment of FIG. 7 illustrates another example common lubricant reservoir configuration. As illustrated for the embodiment of FIG. 7, the lubricant reservoir 702 may include vertical outer walls 711a, 711b and horizontal outer walls 719a, 719b. Other vertical walls may be present but are not illustrated in FIG. 7 for sake of brevity. The lubricant reservoir 702 may further include an internal partition 710 that may form a primary reservoir portion 712 that may feed lubricant to a primary discharge port 713 and a secondary reservoir portion 714 that may feed lubricant to a secondary discharge port 715. The lubricant reservoir 702 may further include at least one supply port 716.

The internal partition 710 may include a vertical portion 783 that may be provisioned in a vertical configuration inside the lubricant reservoir 702 such that the vertical portion 783 of the internal partition 710 may be substantially parallel with the vertical outer walls 711a, 711b of the lubricant reservoir 702. The internal partition 710 may further include a first cross member 784 that may extend from an upper area of the vertical portion 783 toward the vertical outer wall 711b to a distance that is less than the width of the primary reservoir portion 712 to provide a first opening 785 through which lubricant may flow in order to fill the primary reservoir portion 712 during operation. The internal partition 710 may also include a second cross member 786 that may extend from an upper area of the vertical portion 783 toward the vertical outer wall 711a to a distance that is less than the width of the secondary reservoir portion 714 to provide a second opening 787 through which lubricant may flow in order to fill the secondary reservoir portion 714 during operation.

The first and second cross members 784, 786 of the partition 710 may help do keep lubricant in the primary reservoir portion 712 and the secondary reservoir portion 714 from being "sloshed" or otherwise displaced between the reservoir portions 712, 714 during normal operation and/or during a LOL event. In some embodiments, one or both of the first and/or the second cross members 784, 786 may be sloped in a direction toward the horizontal (bottom) outer wall 719b of the lubricant reservoir 702; however, in other embodiments, one or both of the first and/or the second cross members 784, 786 may not be sloped toward the horizontal (bottom) outer wall 719b of the lubricant reservoir 702, as illustrated by the dashed line at the top of the vertical portion 783 of the partition 710 of the embodiment of FIG. 7. The size of the openings 785, 787, respectively, may be varied based on the length of the first and the second cross members 784, 786, respectively.

Figure 8:
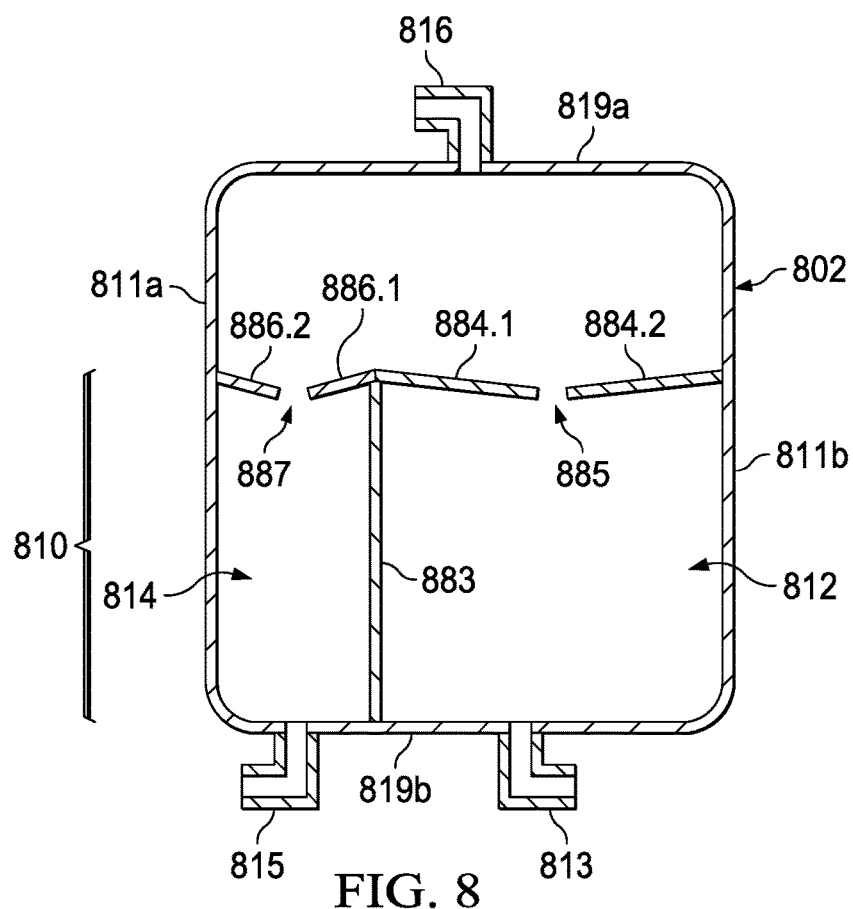
FIG. 8 is a side, cross-sectional view illustrating example details associated with yet another example lubricant reservoir configuration that may be used in a lubrication system, in accordance with certain embodiments.

Referring to FIG. 8, FIG. 8 is a side, cross-sectional view of yet another example lubricant reservoir configuration for an example lubricant reservoir 802 that may be used in a lubrication system (e.g., lubrication system 300 of FIGS. 3, 4A-4B, and 5), in accordance with certain embodiments. The embodiment of FIG. 8 illustrates another example common lubricant reservoir configuration. As illustrated for the embodiment of FIG. 8, the lubricant reservoir 802 may include vertical outer walls 811a, 811b and horizontal outer walls 819a, 819b. Other vertical walls may be present but are not illustrated in FIG. 8 for sake of brevity. The lubricant reservoir 802 may further include an internal partition 810 that may form a primary reservoir portion 812 that may feed lubricant to a primary discharge port 813 and a secondary reservoir portion 814 that may feed lubricant to a secondary discharge port 815. The lubricant reservoir 802 may further include at least one supply port 816.

The internal partition 810 may include a vertical portion 883 that may be provisioned in a vertical configuration inside the lubricant reservoir 802 such that the vertical portion 883 of the internal partition 810 may be substantially parallel with the vertical outer walls 811a, 811b of the lubricant reservoir 802. The internal partition 810 may further include first cross member portions 884.1, 884.2 that may be provisioned to provide an opening 885 through which lubricant may flow in order to fill the primary reservoir portion 812 during operation. A first portion 884.1 may extend from an upper area of the vertical portion 883 toward the vertical outer wall 811b and a second portion 884.2 may extend from the vertical outer wall 811b toward the vertical portion 883. Lengths of each of the first cross member portions 884.1, 884.2 may be less than half of the width of the primary reservoir portion 812 in order to form the opening 885. The internal partition 810 may further include second cross member portions 886.1, 886.2 that may be provisioned to provide an opening 887 through which lubricant may flow in order to fill the secondary reservoir portion 814 during operation. A first portion 886.1 may extend from an upper area of the vertical portion 883 toward the vertical outer wall 811a and a second portion 884.2 may extend from the vertical outer wall 811a toward the vertical portion 883. Lengths of each of the second cross member portions 886.1, 886.2 may be less than half of the width of the secondary reservoir portion 816 in order to form the opening 887.

In some embodiments, one or both of the first and/or the second cross member portions 884.1, 884.2 and/or 886.1, 886.2 may be sloped in a direction toward the horizontal (bottom) outer wall 819b of the lubricant reservoir 802; however, in other embodiments, one or both of the first and/or the second cross member portions 884.1, 884.2 and/or 886.1, 886.2 may not be sloped toward the horizontal (bottom) outer wall 819b of the lubricant reservoir 802.

Figure 9:
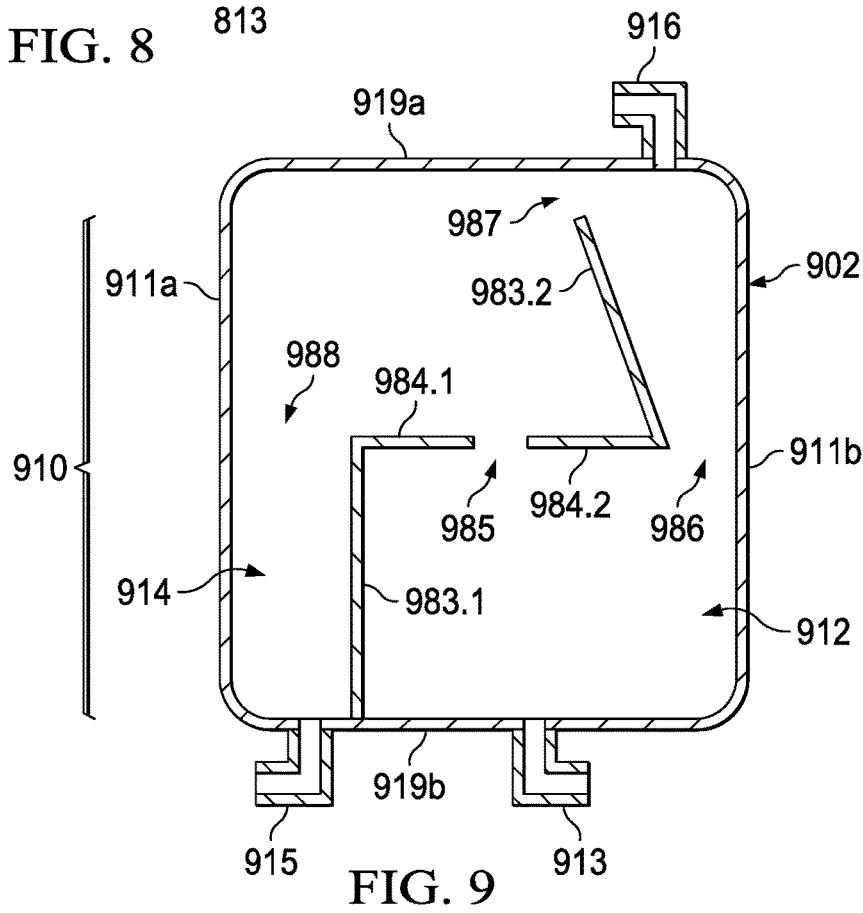
FIG. 9 is a side, cross-sectional view illustrating example details associated with yet another example lubricant reservoir configuration that may be used in a lubrication system, in accordance with certain embodiments.

Referring to FIG. 9, FIG. 9 is a side, cross-sectional view of yet another example lubricant reservoir configuration for an example lubricant reservoir 902 that may be used in a lubrication system (e.g., lubrication system 300 of FIGS. 3, 4A-4B, and 5), in accordance with certain embodiments. The embodiment of FIG. 9 illustrates another example common lubricant reservoir configuration. As illustrated for the embodiment of FIG. 9, the lubricant reservoir 902 may include vertical outer walls 911a, 911b and horizontal outer walls 919a, 919b. Other vertical walls may be present but are not illustrated in FIG. 9 for sake of brevity. The lubricant reservoir 902 may further include an internal partition 910 that may form a primary reservoir portion 912 that may feed lubricant to a primary discharge port 913 and a secondary reservoir portion 914 that may feed lubricant to a secondary discharge port 915. The lubricant reservoir 902 may further include at least one supply port 916.

The internal partition 910 may include a first vertical portion 983.1, a second vertical portion 983.2, a first horizontal portion 984.1, and a second horizontal portion 984.2. A number of openings 985-988 may be formed by the configuration of the vertical and/or horizontal portions of the internal partition 910. In at least one embodiment, the first vertical portion 983.1 may extend from the (bottom) horizontal outer wall 919b toward the (top) horizontal outer wall 919a to a certain height less than the overall height of the lubricant reservoir 902 to form the first volume for the primary reservoir portion 912 and the second volume for the secondary reservoir portion 914. The first horizontal portion 984.1 and the second horizontal portion 984.2 that may be configured to form a first opening 985. For example, the first horizontal portion 984.1 may extend from a top area of the first vertical portion 983.1 toward the vertical outer wall 911b and the second horizontal portion 984.2 may extend from a bottom area of the second vertical portion 983.2 toward the vertical outer wall 911a. The second vertical portion may extend between the second horizontal portion 984.2 and the (top) horizontal outer wall 919b to form a second opening 986 and a third opening 987. A fourth opening 988 may be provided for the reservoir 902 to allow lubricant to fill the secondary reservoir portion 914.

The first opening 985 may allow lubricant within the reservoir 902 to move between the primary reservoir portion 912 and the secondary reservoir portion 914 when the level of lubricant in the reservoir 902 is higher than the first opening 985 and the fourth opening 988. The supply port 916 of the reservoir may be located proximate to the second opening 986 between the second vertical portion 983.2 and the vertical outer wall 911b such that lubricant recirculated from a gearbox may first flow into the primary reservoir portion 912 before filling the secondary reservoir portion 914. In at least one embodiment, the second vertical portion 983.2 may be sloped downward toward the second opening 986 to help funnel lubricant into the primary reservoir portion 912. The third opening 987 may allow lubricant within the reservoir 902 to move between the primary reservoir portion 912 and the secondary reservoir portion 914 when the level of lubricant in the reservoir 902 is higher than the third opening 987.

During operation, in the event of a failure associated with a SPE that may be pumping lubricant from the secondary reservoir portion 914, the configuration of the partition 910 may help to funnel lubricant recirculated from the gearbox into the primary reservoir portion 912 instead of the secondary reservoir portion 914 and may further help to prevent lubricant from being displaced between the primary reservoir portion 912 and the secondary reservoir portion 914.

Figure 10:
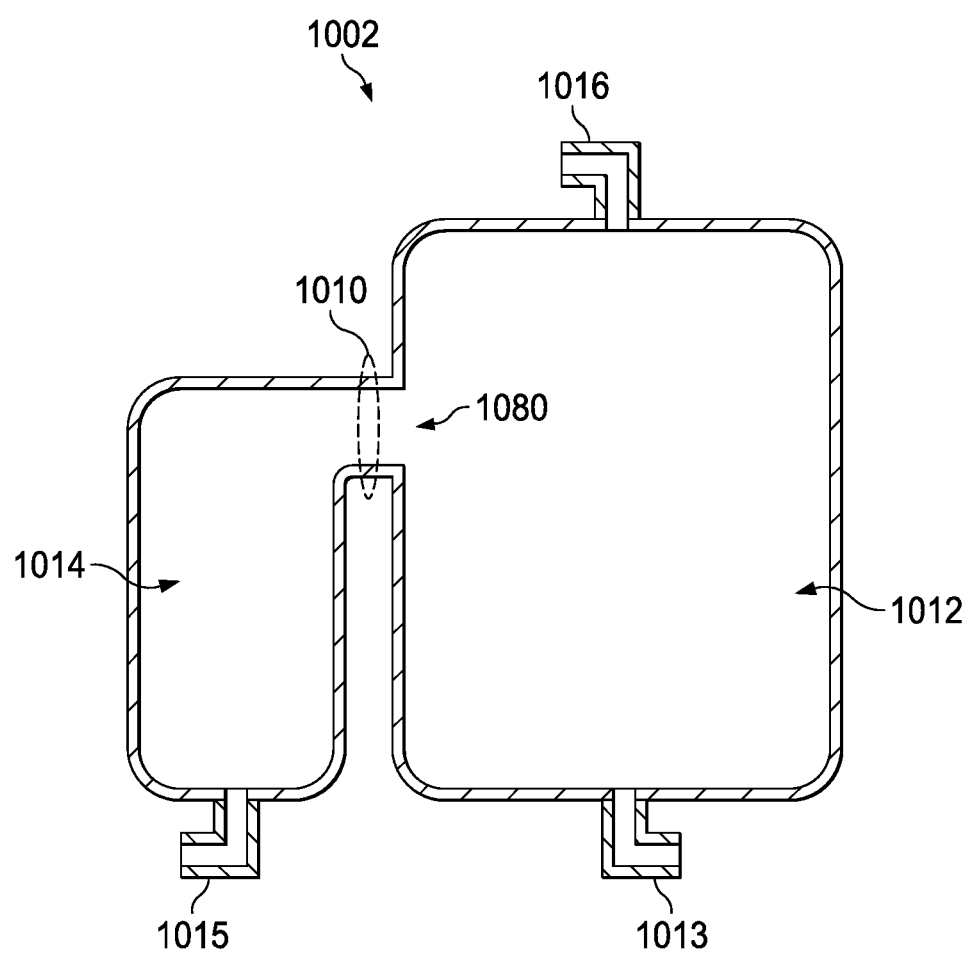
FIG. 10 is a side, cross-sectional view illustrating example details associated with yet another example lubricant reservoir configuration that may be used in a lubrication system, in accordance with certain embodiments.

Referring to FIG. 10, FIG. 10 is a side, cross-sectional view of yet another example lubricant reservoir configuration 1002 that may be used in a lubrication system (e.g., lubrication system 300 of FIGS. 3, 4A-4B, and 5), in accordance with certain embodiments. The embodiment of FIG. 10 illustrates an example lubricant reservoir configuration in which lubricant is shared between a primary reservoir and a secondary reservoir via an interconnection between the reservoirs. As illustrated for the embodiment of FIG. 10, the lubricant reservoir configuration 1012 may include a primary reservoir 1012 including at least one supply port 1016 and a primary discharge port 1013, a secondary reservoir 1014 including a secondary discharge port 1015, and an interconnection 1010 between the primary reservoir 1012 and the secondary reservoir 1014. The primary reservoir 1012 may have a first overall height and a first volume and the secondary reservoir 1014 may have a second overall height and a second volume such that the first overall height may be greater than the second overall height and the first volume may be greater than the second volume. The interconnection 1010 may be configured such that an opening 1080 may be provided to allow lubricant to be shared between the reservoirs 1012, 1014 when the lubricant is at a level that allows it to flow through the interconnection 1010.

In some embodiments, the primary reservoir 1012 and the secondary reservoir 1014 may be formed (e.g., from sheet metal, from cast aluminum, etc.) integrated together such that the interconnection 1010 may be an integrated portion for the lubricant reservoir configuration 1002 (as shown in the embodiment of FIG. 10). In other embodiments, the primary reservoir 1012 and the secondary reservoir 1014 may be formed as separate reservoirs for the lubricant reservoir configuration 1002 such that the interconnection 1010 may be at least one hose or tube (or system of hoses and tubes) coupled to a primary interconnection port (not shown) configured for the primary reservoir 1012 and further coupled to a secondary interconnection port (not shown) configured for the secondary reservoir 1014 to allow lubricant to be shared between the reservoirs when the lubricant is at a level that allows it to flow through the interconnection 1010.

The example lubricant reservoir configurations illustrated for various embodiments described herein are only a few of the many possible configurations of lubricant reservoirs and are not meant to limit the broad scope of the present disclosure. Virtually any other lubricant reservoir configurations may be envisioned and, thus, are clearly within the scope of the present disclosure.

Figure 11:
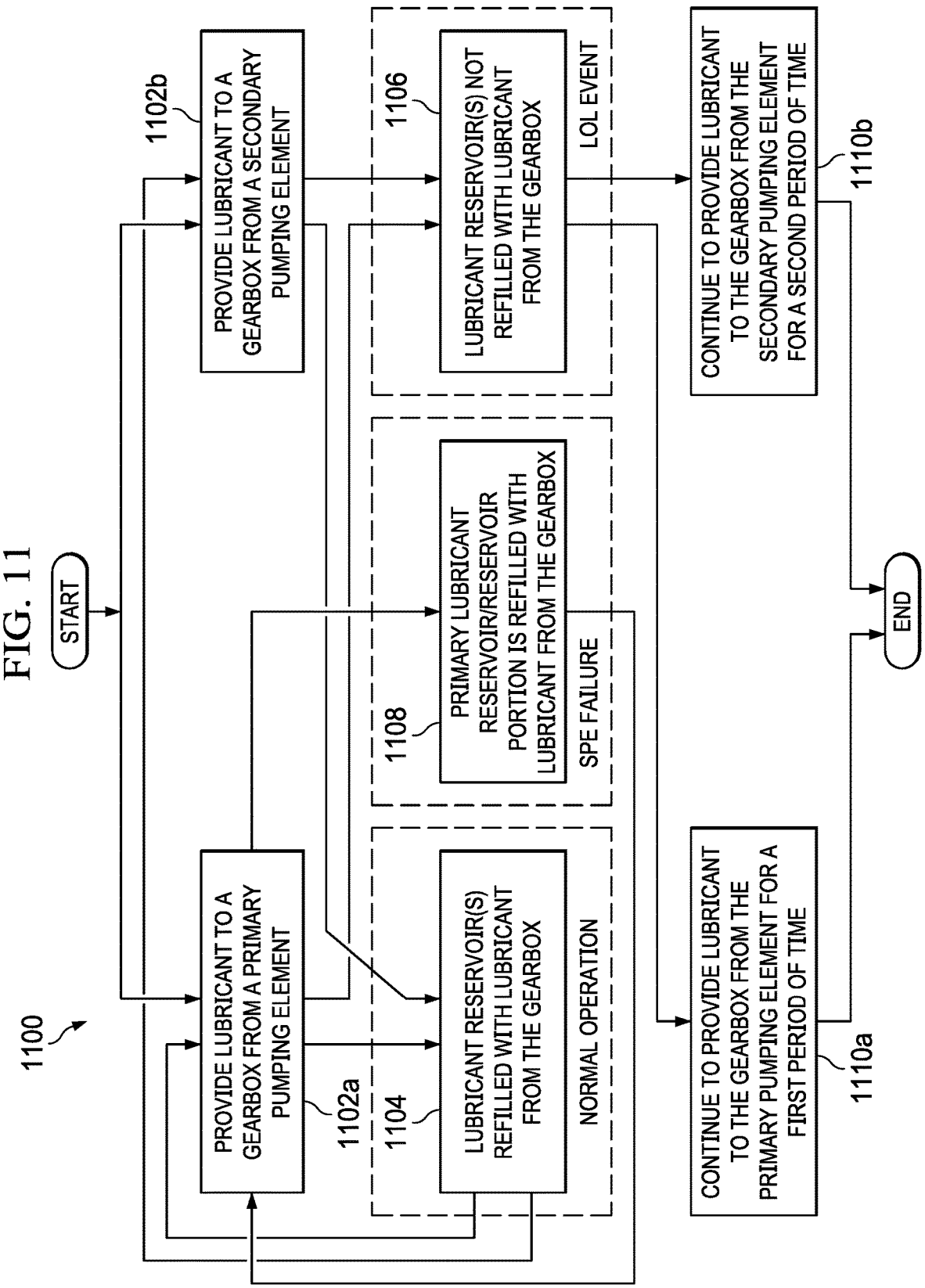
FIG. 11 is a simplified flowchart illustrating example details associated with providing lubricant to a gearbox of an aircraft, in accordance with certain embodiments.

Referring to FIG. 11, FIG. 11 is a simplified flowchart 1100 illustrating example details associated with providing lubricant to a gearbox of an aircraft using a lubrication system (e.g., lubrication system 300 of FIGS. 3, 4A-4B, and 5) that includes a primary pumping element and a secondary pumping element that may both be continuously operating to provide lubricant to the gearbox from a shared lubricant reservoir, in accordance with certain embodiments.

The flowchart may begin at 1102a at which lubricant may be pumped by the primary pumping element from a primary reservoir/reservoir portion of one or more lubricant reservoir(s) (e.g., for a common reservoir configuration or a shared reservoirs configuration) to a gearbox. The lubricant may be pumped by the primary pumping element at a first flow rate. At 1102b, lubricant may also be pumped by the secondary pumping element from a secondary reservoir/reservoir portion of the one or more lubricant reservoir(s) to the gearbox. The lubricant may be pumped by the secondary pumping element at a second flow rate. During normal operation, the lubricant may be supplied from the gearbox back into the lubricant reservoir(s) to refill the primary and the secondary reservoir/reservoir portions at 1104 and the pumping at 1102a and 1102b may continue.

However, during a LOL event, lubricant may not be supplied back into the lubricant reservoir(s), as shown at 1106. During a LOL event, lubricant may continue to be provided (1110a) to the gearbox by the primary pumping element from the primary reservoir/reservoir portion at the first flow rate for a first period of time until the primary reservoir portion is emptied of its lubricant. Lubricant may also continue to be provided (1110b) to the gearbox by the secondary pumping element from the secondary reservoir/reservoir portion at the second flow rate for a second period of time until the secondary reservoir portion is also emptied of its lubricant. The first period of time that the primary pumping element may provide lubricant to the gearbox may expire before the second period of time that the secondary pumping element may provide lubricant to the gearbox. Thus, at least a first portion of the first period of time and the second period of time may overlap and at least a second portion of the first period of time and the second period of time may not overlap. Upon expiration of both the first period of time and the second period of time, the flowchart may end.

In some cases, a failure associated with the SPE may occur in which case the primary lubricant reservoir/reservoir portion may be refilled with lubricant from the gearbox as shown at 1108. In case of a failure associated with the SPE, lubricant may continue to be provided to (1110a) to the gearbox by the primary pumping element from the primary reservoir/reservoir portion at the first flow rate.

The flowcharts and diagrams in the Figures illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of', 'one or more of', and the like can be represented using the '(s)' nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A system comprising:
   a first reservoir for a lubricant;

a second reservoir for the lubricant, wherein the first reservoir and the second reservoir are interconnected;
a first pumping element to pump the lubricant from the first reservoir at a first flow rate;
a second pumping element to pump the lubricant at a second flow rate, wherein the first flow rate and the second flow rate are different; and
a gearbox coupled to the first pumping element and the second pumping element;
wherein the first reservoir is a first reservoir portion of a common reservoir and the second reservoir is a second reservoir portion of the common reservoir with at least one internal partition placed between the first and the second reservoir portions; and
wherein the common reservoir comprises a supply port for supplying the lubricant to both the first reservoir and the second reservoir.

2. The system of claim 1, wherein the gearbox is further coupled to the first reservoir.

3. The system of claim 1, wherein the gearbox is further coupled to the common reservoir.

4. The system of claim 1, wherein the first reservoir has a larger volume than the second reservoir.

5. The system of claim 1, wherein the first flow rate is higher than the second flow rate.

6. The system of claim 1, wherein the first flow rate is at least ten times greater than the second flow rate.

7. The system of claim 1, wherein the first pumping element is to pump the lubricant to the gearbox for a first period of time and the second pumping element is to pump the lubricant to the gearbox for a second period of time.

8. The system of claim 7, wherein at least a portion of the first period of time and a portion of the second period of time overlap, and least a portion of the first period of time and a portion of the second period of time do not overlap.

9. The system of claim 1, wherein the system is configured within a wing of a tiltrotor aircraft and the gearbox is associated with a nacelle of the tiltrotor aircraft.

10. An aircraft comprising:
a lubrication system, the lubrication system comprising:
a first reservoir for a lubricant;
a second reservoir for the lubricant, wherein the first reservoir and the second reservoir are interconnected;
a first pumping element to pump the lubricant from the first reservoir at a first flow rate; and
a second pumping element to pump the lubricant at a second flow rate, wherein the first flow rate and the second flow rate are different;
wherein the first reservoir is a first reservoir portion of a common reservoir with at least one internal partition placed between the first and the second reservoir portions; and
wherein the common reservoir comprises a supply port for supplying the lubricant to both the first reservoir and the second reservoir.

11. The aircraft of claim 10, further comprising:
a gearbox for a rotor system of the aircraft, wherein the gearbox is coupled to the first pumping element, the second pumping element, and the first reservoir.

12. The aircraft of claim 10, further comprising:
a gearbox for a rotor system of the aircraft, wherein the gearbox is coupled to the first pumping element, the second pumping element, and the common reservoir.

13. The aircraft of claim 10, wherein the first flow rate is higher than the second flow rate.

14. The aircraft of claim 10, wherein the first pumping element is to pump the lubricant for a first period of time and the second pumping element is to pump the lubricant for a second period of time, and at least a first portion of the first period of time and the second period of time overlaps and at least a second portion of the first period of time and the second period of time does not overlap.

15. A method comprising:
providing lubricant to a gearbox from a first pumping element at a first flow rate, wherein the lubricant is provided to the gearbox from a first a reservoir; and
providing the lubricant to the gearbox from a second pumping element at a second flow rate, wherein the lubricant is provided to the gearbox from a second reservoir that is interconnected with the first reservoir, and the gearbox is associated with a rotor system of an aircraft;
wherein the first reservoir is a first reservoir portion of a common reservoir with at least one internal partition placed between the first and the second reservoir portions; and
wherein the common reservoir comprises a supply port for supplying the lubricant to both the first reservoir and the second reservoir.

16. The method of claim 15, wherein the first flow rate is greater than the second flow rate.

17. The method of claim 15, wherein providing the lubricant to the gearbox from the first pumping element further comprises providing the lubricant to the gearbox for a first period of time, and providing the lubricant to the gearbox from the second pumping element further comprises providing the lubricant to the gearbox for a second period of time.

18. The method of claim 17, wherein at least a first portion of the first period of time and the second period of time overlaps and at least a second portion of the first period of time and the second period of time does not overlap.

* * * * *